June 19, 1956  A. L. FREEDLANDER ET AL  2,750,606
FOAM RUBBER PILLOW CONSTRUCTION
Filed May 14, 1953  2 Sheets-Sheet 1
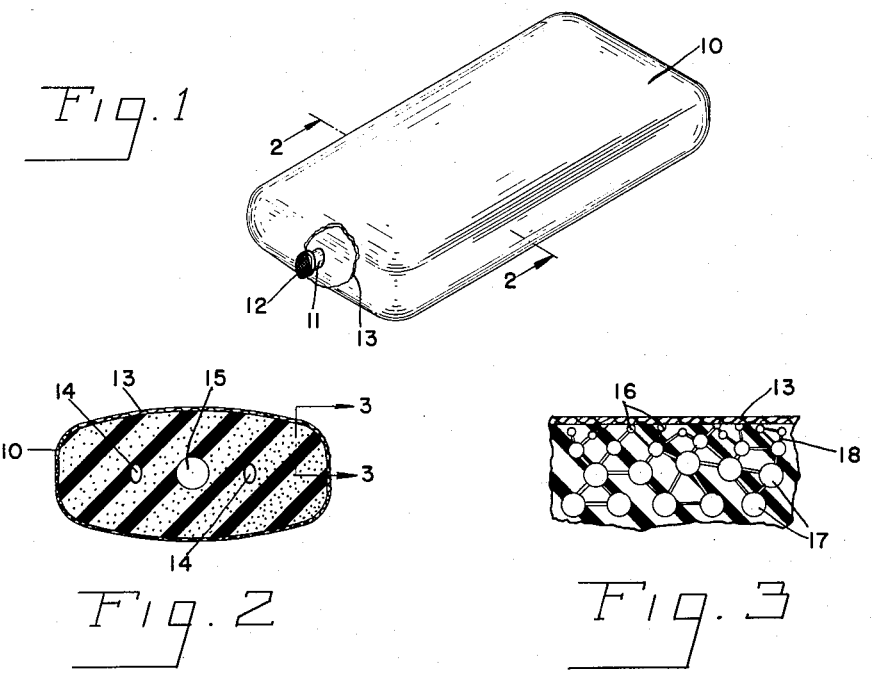
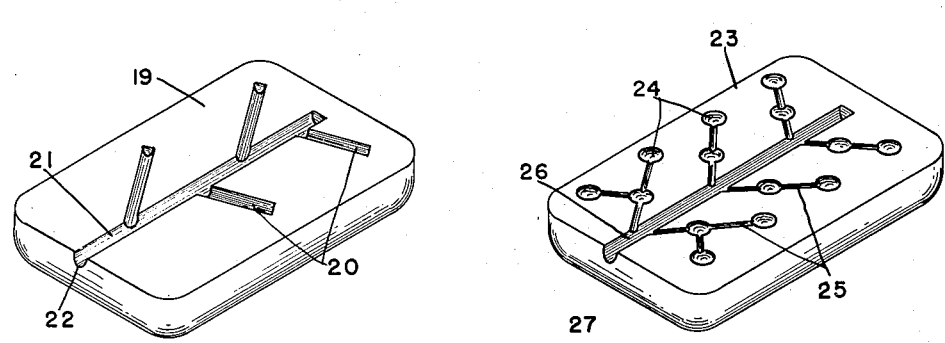
INVENTOR.
A. L. FREEDLANDER
N. D. WATERS
BY
ATT'Y June 19, 1956   A. L. FREEDLANDER ET AL   2,750,606
FOAM RUBBER PILLOW CONSTRUCTION Filed May 14, 1953   2 Sheets-Sheet 2

INVENTOR.
A. L. FREEDLANDER
N. D. WATERS

United States Patent Office 2,750,606
Patented June 19, 1956

2,750,606

FOAM RUBBER PILLOW CONSTRUCTION

Abraham L. Freedlander, Dayton, Ohio, and Norman D. Waters, Mamaroneck, N. Y., assignors to The Dayton Rubber Company, a corporation of Ohio Application May 14, 1953, Serial No. 354,936

6 Claims. (Cl. 5—337)

The present invention relates to cellular rubber articles particularly articles of bedding composed of foam rubber and the like. More specifically, the present invention relates to foam rubber articles, the interior of which is vented to the atmosphere. This invention also encompasses the method for manufacturing such items.

In the manufacture and use of foam rubber articles particularly foam rubber articles of bedding such as pillows, mattresses, and the like, softness, or ease of deformability, and resiliency or "nerve" are considered to be of primary importance. These desirable properties are outstanding in foam rubber articles particularly foam rubber articles wherein the internal cell structurce or pores are intercommunicating. In effect, articles of such a structure comprise an open interconnecting network of rubber cells, each of which is surrounded by and filled with air. Upon the deflection of such items the interconnected cells or pores tend to "breathe" whereupon the air from the interior of the article tends to escape through the intricate channel structure formed by the interconnected pores into the open atmosphere. This flow of the air from within the interior of the article to the open atmosphere has not, however, been completely unrestricted insofar as the cells or pores near the surface of the article are often considerably smaller than the cells interiorly thereof and the interconnecting channels are of relatively small diameter with the result that a certain amount of the air that would ordinarily escape from the interior of the pillow is trapped therein thus affecting the ease of deformability and, insofar as the return of air from the atmosphere into the interior of the pillow is concerned, the resiliency of the article is adversely affected.

It is has further developed that in the use of foam rubber articles, particularly items of bedding, the personal preference of a user in one case might call for a readily deformable, extremely soft pillow or mattress whereas that of another user might dictate a firmer and harder support.

It is therefore an object of the present invention to provide a cellular rubber article of improved softness and resilience.

It is a particular object of the present invention to provide foam rubber articles of bedding such as mattresses, pillows, and the like of improved softness and resilience.

It is a further object of the present invention to provide a softer, more resilient foam rubber composition by recognizing and utilizing the fact that the pores or cells within the interior of such molded compositions are larger than those on the surface thereof.

It is yet a further object of the present invention to provide a foam rubber pillow, mattress or the like wherein the resiliency and softness of the finished product may be adjustably controlled by the user thereof.

It is a further object of the present invention to provide a method for the manufacture of such articles.

To achieve these and other objects and advantages of the present invention which will be apparent from a reading of the following disclosure, it is proposed to provide a vent or exhaust passage connecting the larger cells interiorly of the foam rubber article with the open atmosphere surrounding its surface. When a pillow or similar article having such a vent or exhaust passage is compressed or deflected, the air entrapped within the cells or pores interiorly of the article, rather than being forced to escape only through the surface pores of the article which pores are ordinarily considerably smaller than those within its interior, will follow the path of least resistance and travel through the interior pores to the vent passage. This ease of flow of air from within the pillow to the atmosphere will present the necessity for work being performed to compress this air as it becomes entrapped within the pillow with the result that the pillow may be more easily compressed and accordingly will be softer. When the deflecting force or load is removed from the pillow, a similarly desirable effect will be noted on the resiliency of the pillow, or its ability to return to its normal shape, in that the air from the atmosphere rather than having to pass through the small pores on the surface of the article will be taken in through the vent or exhaust passages where it may pass through and permeate the interior of the pillow by passage through the larger interior pores which will offer less resistance to the flow of such air and will accordingly allow the pillow to return to its original shape more readily.

Since in most cases, the foam rubber composition forming what is known as the "bun" of a pillow or mattress will be surrounded by and enclosed in a fabric cover or ticking, in order to achieve the most efficient utilization of the vents and passages within the rubber mass, the same are connected to a vent tube or spout which projects from the surface of the "bun" and connects with a cooperative opening in the surface of the cover or ticking. Adjustable air flow control means may be provided within this tube or spout portion so that the rate of air passing into or out of the foam rubber article may be varied to control its softness and resiliency.

Refinements of this invention thus generally described will be particularly considered in the following description, for the clarification of which reference may be had to the appended drawing.

In the drawing:

Figure 1 is a partially cut away view in perspective of a typical foam rubber pillow incorporating the features of the present invention.

Figure 2 is a cross section through the pillow of Figure 1 on line 2—2 thereof.

Figure 3 is an enlarged cross section on line 3—3 of Figure 2 showing the structure of the foam rubber composition.

Figure 4 is a perspective of a molded half of a foam rubber pillow incorporating features of the present invention.

Figure 5 is a similar perspective of another pillow half according to this invention.

Figure 6:
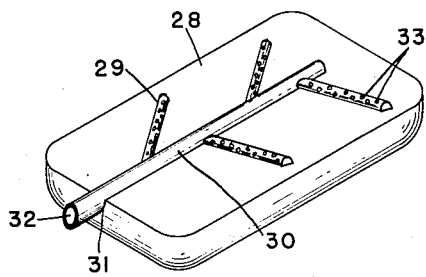
Figure 6 is a similar view in perspective of a modified embodiment of present invention.

Referring now to Figures 1, 2 and 3, there is shown a foam rubber article 10 such as might be used as a pillow having the exhaust nozzle or air escape spout 11 projecting from the side thereof. This spout 11 is connected to the vent eyelet 12 which is clamped to the case or ticking 13. The small air passages provided within the interior of the rubber-like article according to the present invention are shown in Figure 2 at 14 and the larger trunk air flow channel centrally disposed within the interior of the article is shown at 15.

As best shown in Figure 3, a typical structure of foam rubber from which such articles as pillows and mattresses and the like may be constructed comprises a cellular structure wherein the cells or pores 16 and 17 are interconnected as shown at 18. Such a structure of interconnected pores is characterized by the fact that it is pervious to the flow of air and is often referred to as stereoreticulate. As previously explained, it is a characteristic of foam rubber articles which are molded, particularly in metallic surface molds, that the pores near the surface of the article such as 16 will be smaller than the pores or cells located interiorly thereof such as at 17.

In view of this difference in pore size between the surface and the interior of a foam rubber article and further in view of the fact that, regardless of the size of the pores, they will exert a certain amount of restraint upon the free flow of air passing through them, the present invention is designed to facilitate movement of this air within the article and particularly to facilitate its being vented or allowed to escape into the surrounding atmosphere. When the passages such as 14 and 15 are provided interiorly of the article, they tend to accommodate the flow of air within the article at the point at which such flow would normally be greatest, that is, where the larger cells or pores 17 offer the least restrictions to such flow. In order that the channels or passages 14 and 15 will provide an easy outlet for the air within the sponge rubber article, it is obvious that the same should be considerably larger in cross-section than are the pores themselves.

Since most molded articles of foam rubber composition are molded in two parts, and thereafter assembled by cementing such parts together, a convenient means for providing the necessary channel such as those at 14 and 15 of Figure 2, within the interior of the article, consists of merely providing surface depressions in the form of the passages to be desired, upon that surface of the article which will subsequently be joined with another half to form the whole.

An example of a molded foam rubber pillow half having the above described depressions forming the exhaust or vent passages, or at least a half cross section thereof, is shown in Figure 4 where the pillow half 19 is provided on its surface, subsequently to be joined to a cooperative half, with branching recessed channels 20 all leading to the trunk channel 21 which is vented to the atmosphere by opening upon the edge of the pillow half at 22. It is apparent that, if such a pillow half be joined at the surface upon which the aforementioned depressions are formed with a pillow half having correspondingly placed channel-like depressions, the passages located such as those in 14 and 15 of Figure 2 will be formed substantially in the center of the final article.

A modification of this invention as applied to the ordinary type of molded foam rubber article wherein core pins are mounted upon the mold wall so as to form density controlling core pin recesses in such rubber articles is shown in Figure 5. The pillow half 23 is provided in the usual manner with the typical arrangement of core pin recesses or cavities 24 arranged in the regular pattern opening upon that surface of the pillow half which will eventually be joined with a corresponding surface of another half to form a whole pillow. Since these core pin cavities represent a reservoir of air within the interior of the pillow and, to that extent, may be considered as nothing more than extremely large pores or cells within the cellular rubber structure, advantage of these core pins may be taken by connecting them by means of small branch air flow passages 25 with the main trunk channel 26 which, in turn, opens upon the edge of the pillow as shown at 27. The air normally occupying these core pin cavities 24 will readily flow from the same upon deflection of the pillow and will just as readily be carried by the branch passages 25 and main channel 26 to the surrounding atmosphere, thereby allowing the pillow or similar article to be most easily deformed.

In certain instances as, for example, where severe flexing of the article is to be anticipated, it may be desirable, in addition to providing the channels or passages as above described within the interior of the article, to insert an additional conduit of flexible material within the channels thus formed so as to provide a liner therefor. Such an arrangement is shown in Figure 6 where the pillow half 28 might be provided with surface recessed passages similar to those of the pillow half of Figure 4. Rather than allowing these depressions themselves to form the ultimate passages, however, the small flexible tubing such as the branch tubes 29 connected to the main trunk tube 30 may be provided. As shown in Figure 6 the main tube 30 may be allowed to extend through and beyond the opening in the edge of the pillow half at 31 forming the exhaust spout or nozzle 32. As a means of further improving the uninhibited movement of the air where these tubular conduits are provided within the article, the branch tubes 29 and/or the main trunk tube 30 may be provided with perforations through their walls such as are shown at 33.

Figure 7:
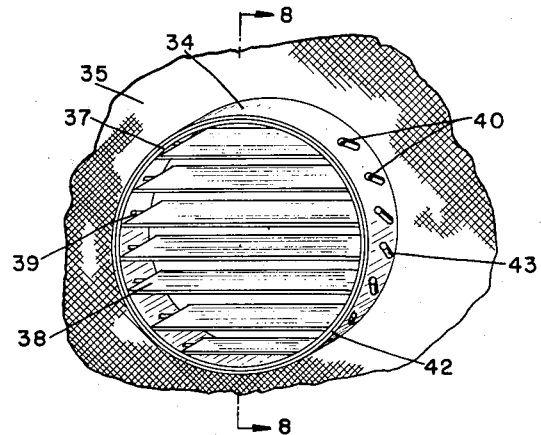
Figure 7 is a perspective view of a preferred flow control device to be mounted upon the cover of an article incorporating the features of this invention and connected to the air spout projecting therefrom.
Figure 9:
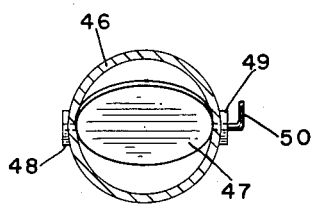
Figure 9 is a view in perspective and partial cross section showing an exhaust tube and a modified flow control device positioned therein.
Figure 8:
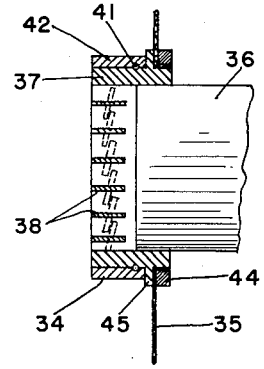
Figure 8 is a cross section through the flow control means of Figure 7 on line 8—8 thereof.

It is to be understood that in any of the foregoing arrangements of interior air passages or channels, no matter how formed, provision should always be made for connecting these channels serving the interior of the article with the surrounding atmosphere. As previously explained, in order that the discharged air will be allowed to pass through the case or ticking normally surrounding the article, a nozzle or exhaust spout similar to 11 of Figure 1 or 32 of Figure 6 should be provided, whether or not a tubular liner, such as that considered in connection with Figure 6, is used throughout the remainder of the passages.

Where a variety of characteristics of deformability or softness and resiliency or "nerve" are desired as, for example, might be the case with regard to a pillow or mattress used by several sleepers of different personal likes with regard to bedding items, the flow of the air from the interior of the article to the atmosphere may be adjustably controlled by provision of a suitable valvular arrangement such as that shown in Figures 7, 8 and 9. In Figures 7 and 8 there is shown a shutter-type valve 34 mounted upon the fabric casing 35 and connected to the vent spout 36, which, according to this invention, communicates with a series of air passages disposed within the "bun" of a foam rubber bedding item.

The valve 34 comprises an inner ring 37 within which are pivotally mounted a plurality of parallel vanes or louvers 38. The mounting at one end of these vanes comprises a rod 39 which is integrally connected to the vane at one end and rests in a recessed pivotal bearing within the inner ring 37. The mounting at the other end of the vanes comprises an eccentric, crank-type rod fixedly associated with the vanes and passing through holes in the inner ring 37 so that a crank-type handle is provided. The ends of such crank rod are shown at 40. About the inner ring is fastened by means of a retainer clip 41 a slip ring 42 which is provided with slotted apertures 43 which are angularly disposed to the direction in which the slip ring may be turned, so that upon a counter-clockwise turning of the slip ring, the crank handles 40 will be rotated thereby causing the parallel vanes to pivot to an overlapping or closed position as shown by the dotted lines in Figure 8. The friction between the inner ring and the outer slip ring will hold the same in any fixed relative position so that the vanes will offer adjustably varying degrees of restriction to the flow of air from and into the foam rubber mass thereby controlling its softness and resiliency. The valve 34 may be clamped to the casing 35 by means of a grommet 44 which holds the casing against the outer surface of the inner ring and raised shoulder portion 45 rising perpendicularly therefrom.

An alternative type of valvular arrangement to be incorporated within the vent spout according to this invention might consist of a butterfly valve as shown in Figure 9. Within the spout 46 is mounted the vane 47 pivotally supported in bearing blocks 48 and 49, this vane being adjustable by operation of the handle 50 attached thereto.

While the present invention has been described in considerable detail and specific examples and embodiments have been employed in the present disclosure, it is to be understood that all such specific references are for purposes of illustration only and are in no way intended to limit the scope of the present invention as particularly defined in the subjoined claims.

We claim:

1. An article of bedding composed of a stereoreticulate, cellular rubber-like composition which comprises an interiorly disposed arrangement of flexible tubing forming interconnected air passages, and a surface opening in association with said passages whereby, upon compression of said bedding article, the gas within the cells thereof may be vented through the passages to the surrounding atmosphere.

2. An article of manufacture according to claim 1 wherein said flexible tubing is perforated.

3. A foam rubber bedding article comprising an internal structure of interconnecting cells, and an interiorly arranged system of interconnecting passages of much greater cross-section than any of said cells, a surface opening associated with said passages and a tubular member positioned within said passages and protruding from the surface of said article at said surface opening.

4. An article of manufacture according to claim 3 wherein said tubular spout member is provided with an adjustable flow control valve whereby the rate of collapse of the article under compression may be controlled.

5. As an article of manufacture, a foam rubber pillow having a fabric cover comprising an interior arrangement of interconnecting fluid passages, a surface opening associated with said passages, a similarly spaced opening in said fabric cover and a tubular member positioned within said passages and connecting the opening in the fabric cover with the opening associated with said passages whereby air escaping from the foam rubber pillow will also readily escape through said fabric cover.

6. As an article of manufacture, a cellular rubber cushioning item comprising a plurality of interiorly spaced core pin cavities, an exhaust orifice opening upon the surface of said cushion and flexible tubing connecting said core pin cavities with said exhaust orifice whereby upon compression of the cushion, the gas therewithin will flow through said flexible tubing to the exhaust orifice and then into the surrounding atmosphere.

References Cited in the file of this patent

UNITED STATES PATENTS

| | | |
|---|---|---|
| 2,295,363 | Schott | Sept. 8, 1942 |
| 2,325,223 | Brewster | July 27, 1943 |
| 2,542,781 | Sawyer | Feb. 20, 1951 |